United States Patent
Ankamreddi et al.

(10) Patent No.: US 9,093,910 B1
(45) Date of Patent: Jul. 28, 2015

(54) PREDICTIVE SAMPLING FOR PRIMARY SIDE SENSING IN ISOLATED FLYBACK CONVERTERS

(71) Applicant: Maxim Integrated Products, Inc., San Jose, CA (US)

(72) Inventors: Ramakrishna Ankamreddi, Bangalore (IN); Naresh Venkata Kotikelapudi, Bangalore (IN); Ramesh Giri, Bangalore (IN)

(73) Assignee: MAXIM INTEGRATED PRODUCTS, INC., San Jose, CA (US)

( * ) Notice: Subject to any disclaimer, the term of this patent is extended or adjusted under 35 U.S.C. 154(b) by 0 days.

(21) Appl. No.: 14/277,373

(22) Filed: May 14, 2014

Related U.S. Application Data

(60) Provisional application No. 61/939,947, filed on Feb. 14, 2014.

(51) Int. Cl.
 *H02M 3/335* (2006.01)
(52) U.S. Cl.
 CPC ................................. *H02M 3/33523* (2013.01)
(58) Field of Classification Search
 CPC ..................... H02M 3/33523; H02M 3/33507; H02M 3/33561; H02M 3/335; H02M 3/36; H02M 3/33569
 See application file for complete search history.

(56) References Cited

U.S. PATENT DOCUMENTS

| | | | |
|---|---|---|---|
| 4,683,528 A * | 7/1987 | Snow et al. | 363/21.15 |
| 5,438,499 A | 8/1995 | Bonte et al. | |
| 5,841,643 A | 11/1998 | Schenkel | 363/21 |
| 7,463,497 B2 | 12/2008 | Negrete | |
| 7,471,522 B2 | 12/2008 | Ng et al. | |
| 7,486,528 B2 | 2/2009 | Yang | |
| 8,213,192 B2 | 7/2012 | Konecny et al. | |
| 2005/0024898 A1 | 2/2005 | Yang et al. | |
| 2010/0007394 A1* | 1/2010 | Hsueh et al. | 327/176 |
| 2010/0054000 A1* | 3/2010 | Huynh | 363/21.16 |
| 2011/0216559 A1* | 9/2011 | Ng et al. | 363/21.13 |
| 2011/0242859 A1* | 10/2011 | Chang et al. | 363/21.18 |
| 2011/0261596 A1* | 10/2011 | Zong et al. | 363/21.13 |
| 2012/0008352 A1* | 1/2012 | Huang et al. | 363/95 |
| 2014/0246988 A1* | 9/2014 | Chen | 315/223 |

* cited by examiner

*Primary Examiner* — Emily P Pham

(57) ABSTRACT

A system comprises a pulse width modulator, a voltage sensing circuit, a pulse generator, and a sampling circuit. The pulse width modulator generates a control signal to control a switch connected to an input voltage via a primary winding and to regulate an output voltage across a secondary winding that is supplied to a load through a component connected in series with the secondary winding. The voltage sensing circuit senses a first voltage across the primary winding that represents the output voltage. The pulse generator generates a single pulse at a sampling time during a first cycle of the control signal, which is determined based on the input voltage, a voltage drop across the switch, an on-time of the switch, and the first voltage sensed during the first cycle. The sampling circuit samples the first voltage based on the single pulse at the sampling time during the first cycle.

24 Claims, 9 Drawing Sheets

PREDICTIVE SAMPLING FOR PRIMARY SIDE SENSING IN ISOLATED FLYBACK CONVERTERS

CROSS-REFERENCE TO RELATED APPLICATIONS

This application claims the benefit of U.S. Provisional Application No. 61/939,947, filed on Feb. 14, 2014. The entire disclosure of the application referenced above is incorporated herein by reference.

FIELD

The present disclosure relates generally to power converters and more particularly to switching regulators for isolated flyback power supplies that use primary side sensing for feedback control.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Flyback converters are commonly used in Switched-Mode Power-Supplies (SMPSs), where an output voltage is isolated from an input voltage. An optocoupler is typically used to sense and regulate output voltage on a secondary winding of a transformer.

SUMMARY

A system comprises a switch, a pulse width modulator, a voltage sensing circuit, a pulse generator, a sampling circuit, and an error amplifier. The switch is connected to an input voltage via a primary winding of a transformer. The pulse width modulator generates a control signal including pulse width modulated pulses having a first frequency and a first duty cycle. The pulse width modulator controls the switch based on the control signal and regulates an output voltage across a secondary winding of the transformer by turning the switch on and off at the first frequency. The output voltage is supplied to a load connected across the secondary winding through a component connected in series with the secondary winding. The voltage sensing circuit senses a first voltage across the primary winding during a demagnetization period represented by an off-time of the switch. The first voltage represents the output voltage across the secondary winding. The pulse generator generates a single pulse at a sampling time during each cycle of the control signal. The sampling time during a first cycle of the control signal is determined based on the input voltage, a voltage drop across the switch, an on-time of the switch, and a value of the first voltage sensed during the first cycle of the control signal. The sampling circuit includes a single switch and a single capacitance that samples the first voltage based on the single pulse at the sampling time during the first cycle of the control signal. A sampled value of the first voltage reflects the output voltage with minimized voltage drops across the component and parasitic elements of the secondary winding during the first cycle of the control signal. The error amplifier compares the sampled value of the first voltage to a reference voltage and outputs an error signal to the pulse width modulator during the first cycle of the control signal. The pulse width modulator controls the first duty cycle of the control signal during the first cycle of the control signal based on the error signal generated by the error amplifier.

In another feature, the sampling time is independent of variations in the voltage drops across the component and the parasitic elements of the secondary winding from the first cycle of the control signal to a second cycle of the control signal.

In another feature, the sampling time is programmable to account for variances in a leakage inductance of the transformer.

In another feature, the sampling circuit includes a single switch and a single capacitance.

In another feature, the sampling time occurs after a time period following an on-time of a pulse width modulated pulse in the first cycle of the control signal. The time period is equal to a scaled off-time of the switch minus a sum of a duration of the single pulse and a programmable delay. The programmable delay accounts for variances in a leakage inductance of the transformer.

In another feature, the sampling time lies between an end of an on-time of a pulse width modulated pulse in the first cycle of the control signal and an instant during an off-time of the pulse in the first cycle of the control signal when current in the secondary winding ramps down to zero.

In another feature, the system further comprises a delay circuit that delays the sensing of the first voltage by a first period subsequent to an on-time of a pulse width modulated pulse in the first cycle of the control signal to account for ringing due to a leakage inductance of the transformer and a parasitic capacitance of the switch.

In another feature, the pulse generator comprises a first capacitance that is discharged to a ground potential at a first edge of a pulse width modulated pulse in the first cycle of the control signal, that is charged until a second edge of the pulse width modulated pulse in the first cycle of the control signal, and that is discharged for a first period to a second voltage after waiting for a second period following the second edge of the pulse width modulated pulse in the first cycle of the control signal. A second capacitance is charged to a third voltage after waiting for the second period following the second edge of the pulse width modulated pulse in the first cycle of the control signal until current in the secondary winding becomes zero. A comparator compares the second voltage to the third voltage and generates the single pulse when the third voltage becomes greater than the second voltage.

In another feature, the first period is a sum of the second period, a duration of the single pulse, and a programmable delay.

In another feature, the second capacitance is K times the first capacitance. K is less than or equal to 1.

In another feature, the sampling time is equal to K times an off-time of a pulse width modulated pulse in the first cycle of the control signal minus a sum of a duration of the single pulse and a programmable delay.

In other features, the first capacitance is charged using a first current until the second edge of the pulse width modulated pulse in the first cycle of the control signal, where the first current is proportional to the input voltage. The first capacitance is discharged using a second current for the first period to the second voltage after waiting for the second period following the second edge of the pulse width modulated pulse in the first cycle of the control signal, where the second current is proportional to the first voltage divided by K. The second capacitance is charged using a third current to the third voltage after waiting for the second period following the second edge of the pulse width modulated pulse in the first cycle of the control signal until current in the secondary winding becomes zero, where the third current is proportional to the first voltage.

In still other features, a method comprises generating a control signal including pulse width modulated pulses having a first frequency and a first duty cycle, controlling a switch connected to an input voltage via a primary winding of a transformer based on the control signal, regulating an output voltage across a secondary winding of the transformer by turning the switch on and off at the first frequency, and supplying the output voltage to a load connected across the secondary winding through a component connected in series with the secondary winding. The method further comprises sensing a first voltage across the primary winding during a demagnetization period represented by an off-time of the switch, where the first voltage represents the output voltage across the secondary winding, and generating a single pulse at a sampling time during each cycle of the control signal. The method further comprises determining the sampling time during a first cycle of the control signal based on the input voltage, a voltage drop across the switch, an on-time of the switch, and a value of the first voltage sensed during the first cycle of the control signal. The method further comprises sampling, using a single switch and a single capacitance, the first voltage based on the single pulse at the sampling time during the first cycle of the control signal. A sampled value of the first voltage reflects the output voltage with minimized voltage drops across the component and parasitic elements of the secondary winding during the first cycle of the control signal. The method further comprises comparing the sampled value of the first voltage to a reference voltage, generating an error signal based on the comparison during the first cycle of the control signal, and controlling the first duty cycle of the control signal during the first cycle of the control signal based on the error signal.

In another feature, the sampling time is independent of variations in the voltage drops across the component and the parasitic elements of the secondary winding from the first cycle of the control signal to a second cycle of the control signal.

In another feature, the sampling time is programmable to account for variances in a leakage inductance of the transformer.

In another feature, the sampling of the first voltage is performed using a single switch and a single capacitance.

In another feature, the sampling time occurs after a time period following an on-time of a pulse width modulated pulse in the first cycle of the control signal. The time period is equal to a scaled off-time of the switch minus a sum of a duration of the single pulse and a programmable delay. The programmable delay accounts for variances in a leakage inductance of the transformer.

In another feature, the sampling time lies between an end of an on-time of a pulse width modulated pulse in the first cycle of the control signal and an instant during an off-time of the pulse in the first cycle of the control signal when current in the secondary winding ramps down to zero.

In another feature, the method further comprises delaying the sensing of the first voltage by a first period subsequent to an on-time of a pulse width modulated pulse in the first cycle of the control signal to account for ringing due to a leakage inductance of the transformer and a parasitic capacitance of the switch.

In other features, the method further comprises discharging a first capacitance to a ground potential at a first edge of a pulse width modulated pulse in the first cycle of the control signal, charging the first capacitance until a second edge of the pulse width modulated pulse in the first cycle of the control signal, and discharging the first capacitance for a first period to a second voltage after waiting for a second period following the second edge of the pulse width modulated pulse in the first cycle of the control signal. The method further comprises charging a second capacitance to a third voltage after waiting for the second period following the second edge of the pulse width modulated pulse in the first cycle of the control signal until current in the secondary winding becomes zero. The method further comprises comparing the second voltage to the third voltage, and generating the single pulse when the third voltage becomes greater than the second voltage.

In another feature, the first period is a sum of the second period, a duration of the single pulse, and a programmable delay.

In another feature, the second capacitance is K times the first capacitance. K is less than or equal to 1.

In another feature, the sampling time is equal to K times an off-time of a pulse width modulated pulse in the first cycle of the control signal minus a sum of a duration of the single pulse and a programmable delay.

In other features, the method further comprises charging the first capacitance using a first current until the second edge of the pulse width modulated pulse in the first cycle of the control signal, where the first current is proportional to the input voltage. The method further comprises discharging the first capacitance using a second current for the first period to the second voltage after waiting for the second period following the second edge of the pulse width modulated pulse in the first cycle of the control signal, where the second current is proportional to the first voltage divided by K. The method further comprises charging the second capacitance using a third current to the third voltage after waiting for the second period following the second edge of the pulse width modulated pulse in the first cycle of the control signal until current in the secondary winding becomes zero, where the third current is proportional to the first voltage.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
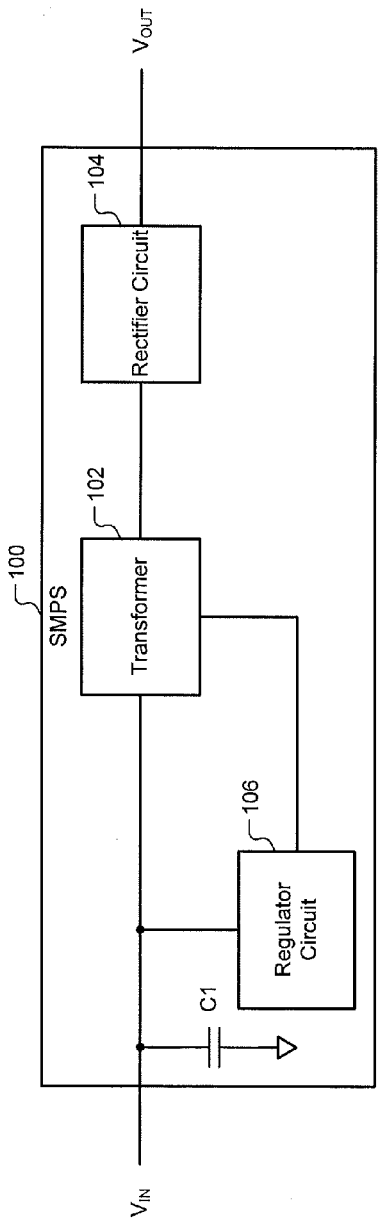
FIG. 1 is a functional block diagram of a switched-mode power supply.

In a flyback converter, to reduce component count and cost, a demagnetized voltage of a transformer can be utilized to regulate an output voltage of the flyback converter. The effectiveness of this method depends on generating a sampling signal to sample the output voltage just before current in the secondary winding of the transformer ramps down to zero in the presence of parasitic elements associated with the transformer and components (e.g., a diode) in the secondary circuit. Most methods use samples of the output voltage sampled in a prior cycle of a control signal instead of in a current cycle of the control signal to determine the sampling instant. Voltage drops across the parasitic elements, however, can change from one cycle to another due to changes in load. Accordingly, the previously sampled output voltage may not include voltage drops across the parasitic elements in the current cycle, which can result in an incorrect sampling time at which the output voltage is sampled in the current cycle.

For example, using the previously sampled output voltage may result in early sampling or delayed sampling. In early sampling, load regulation may be adversely affected due to higher voltage drops across the parasitic elements. In delayed sampling, the output voltage is sampled after the secondary current decreases to zero, which can force the converter to go out of regulation due to non-availability of demagnetized voltage on the primary winding. These methods are therefore unsuitable for applications that use a broad variety of transformers and components in the secondary circuit. Additionally, these methods also use a 2-stage sampling and a plurality of sampling signals, which increase cost, complexity, and probability of error.

The present disclosure relates to an accurate predictive sampling method for primary-side sensing and regulation in isolated flyback converters. The method can be used to generate a feedback signal by sampling a demagnetized voltage of a transformer onto a single-capacitor-based sample-and-hold (S/H) circuit. A sampling time (i.e., an instant at which a sample is taken) is determined such that the demagnetized voltage is sampled just before secondary current ramps down to zero. The feedback signal from the single capacitor is compared to a reference voltage to generate an error signal. The error signal is used to control a duty cycle of a switch connected to the primary winding of the transformer to regulate the output voltage. The sampling time is determined for a given cycle based on an input voltage applied to the primary winding, a voltage drop across the switch, a primary-side conduction-time (set by the duty cycle), and a reflected secondary voltage on the primary winding within the same cycle. The sampling time is independent of parasitic elements posed by the transformer and components (e.g., a diode) connected to the secondary winding because the method uses real-time secondary-side information including voltage drops across a DC resistance (DCR) of the secondary winding and the diode, and the output voltage. The method uses a single sampling signal and a single-capacitor-based sample-and-hold (S/H) circuit.

Referring now to FIG. 1, a switched mode power supply (SMPS) 100 is shown. The SMPS 100 includes a transformer 102, a rectifier circuit 104, and a regulator circuit 106. The transformer 102 receives an input voltage $V_{IN}$. The rectifier circuit 104 rectifies the input voltage $V_{IN}$ and generates an output voltage $V_{OUT}$. The regulator circuit 106 regulates the output voltage $V_{OUT}$.

Figure 2:
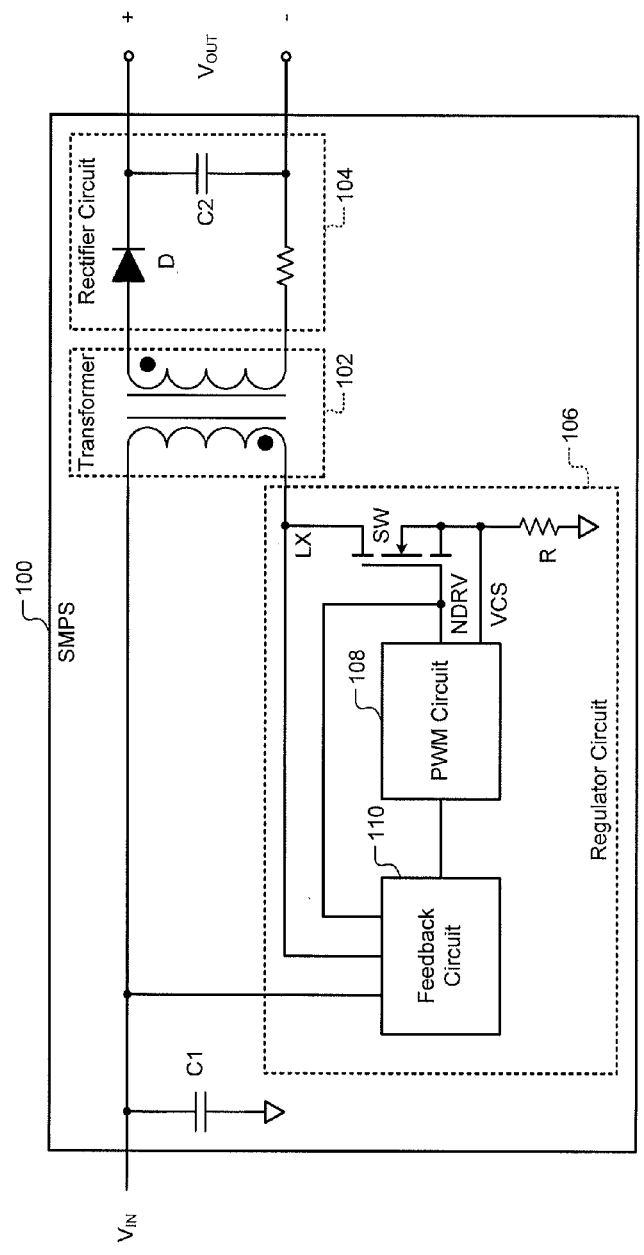
FIG. 2 is a functional block diagram of a switched-mode power supply including a primary side regulator circuit.

Referring now to FIG. 2, the SMPS 100 is shown in detail. The input voltage $V_{IN}$ is applied to a primary winding of the transformer 102 via a capacitance C1. The rectifier circuit 104 is connected to a secondary winding of the transformer 102. The rectifier circuit 104 includes a diode D connected in series with the secondary winding of the transformer 102 and a capacitance C2 connected across the secondary winding of the transformer 102. A parasitic DC resistance (DCR) of the secondary winding of the transformer 102 is shown as a resistance connected in series with the secondary winding of the transformer 102 for illustrative purposes.

The regulator circuit 106 includes a pulse width modulator (PWM) circuit 108, a switch SW, a resistance R, and a feedback circuit 110. The switch SW has a first end connected to the primary winding of the transformer 102 and a second end connected to ground via the resistance R. The PWM circuit 108 generates a control signal (NDRV) including pulse width modulated pulses that turn the switch SW on and off at a predetermined frequency.

Each cycle of the control signal includes a pulse width modulated pulse. Each cycle of the control signal includes an on-time $T_{ON}$ and an off-time $T_{OFF}$. The on-time $T_{ON}$ is equal to a pulse width of the pulse width modulated pulse. When a pulse width modulated pulse turns on the switch SW, the input voltage $V_{IN}$ is applied across the primary winding of the transformer 102. Current flows through the primary winding of the transformer 102 for the duration $T_{ON}$. The primary winding of the transformer 102 stores magnetic energy. The switch SW is turned off at the end of the turn-on-time $T_{ON}$. Once the switch SW is turned off, the magnetic energy is delivered to the secondary winding of the transformer 102 during the time $T_{OFF}$ to generate the output voltage $V_{OUT}$ across the secondary winding of the transformer 102. The output voltage $V_{OUT}$ is delivered to a load (not shown) connected across the secondary winding of the transformer 102.

The feedback circuit 110 generates a feedback signal (an error signal) based on the input voltage $V_{IN}$, the voltage LX, and the control signal generated by the PWM circuit 108. The PWM circuit 108 controls the pulse width (or duty cycle) of the pulse width modulated pulses based on the feedback signal to regulate the output voltage $V_{OUT}$.

Figure 3:
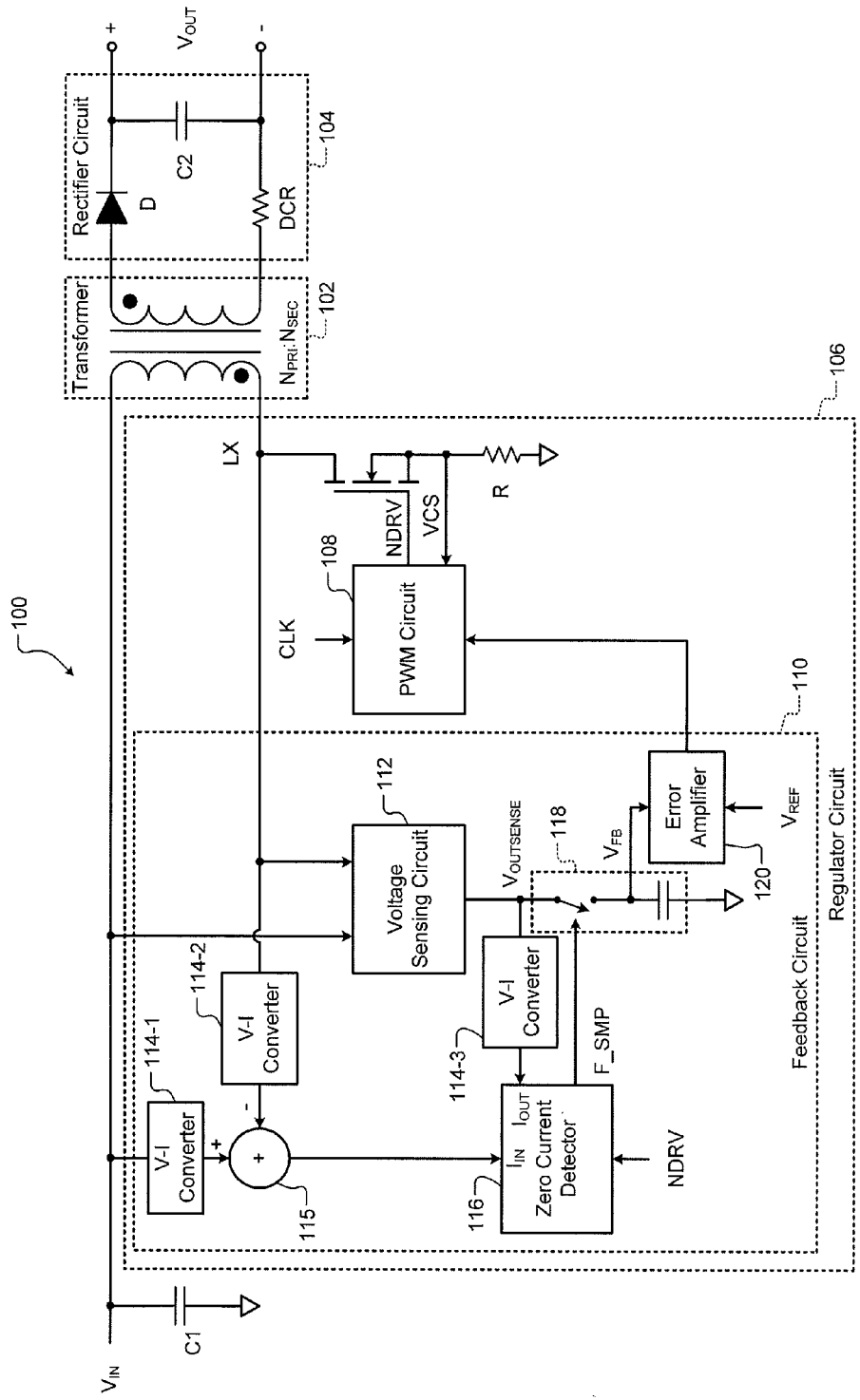
FIG. 3 is a functional block diagram of a switched-mode power supply showing the primary side regulator circuit in detail.

Referring now to FIG. 3, the feedback circuit 110 is shown in detail. The feedback circuit 110 includes a voltage sensing circuit 112; a plurality of V-I converters 114-1, 114-2, 114-3 (collectively V-I converters 114); a zero current detector 116; a sample-and-hold (S/H) circuit (sampling circuit) 118; and an error amplifier 120.

Figure 4:
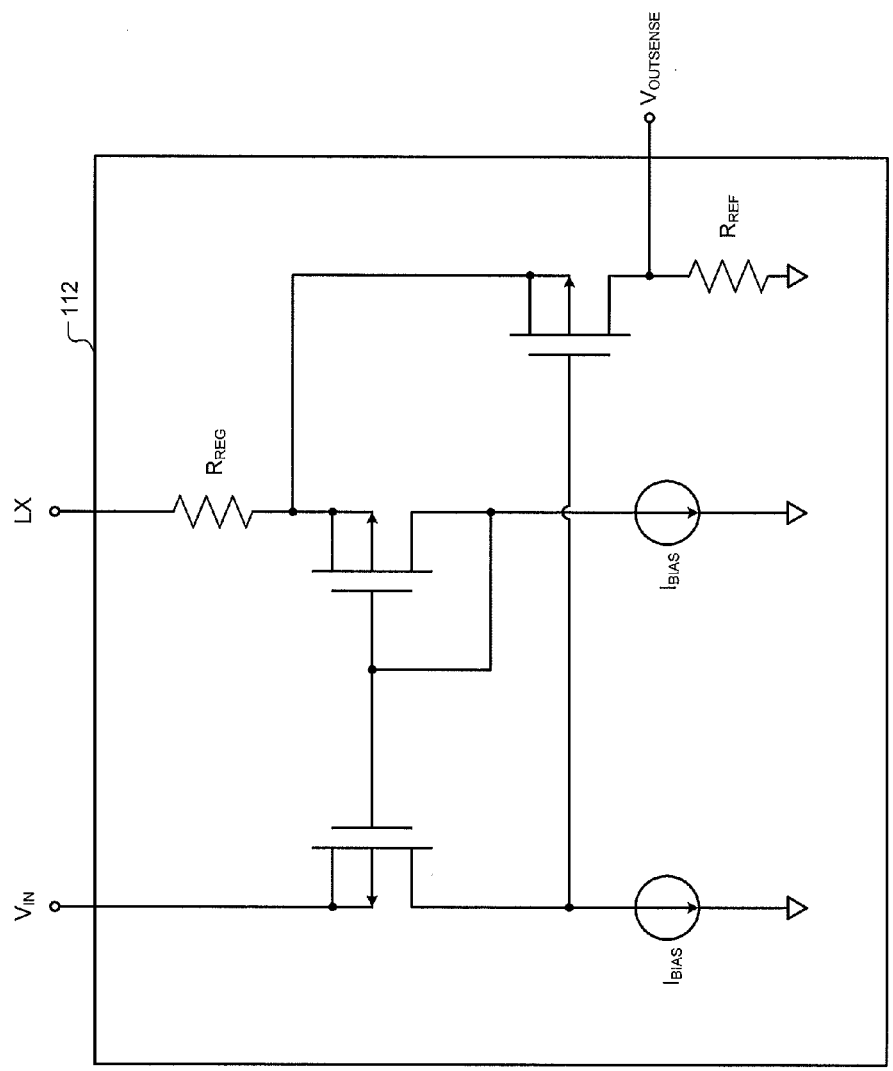
FIG. 4 shows an example of a voltage sensing circuit used in the primary side regulator circuit shown in FIG. 3.

The voltage sensing circuit 112 senses a voltage appearing across the primary winding of the transformer 102 during a secondary conduction-time ($T_{OFF}$) of each cycle of the control signal. The voltage sensing circuit 112 generates $V_{OUTSENSE}$. The voltage sensing circuit 112 may use an attenuation factor 13. The voltage sensing circuit 112 is enabled during the secondary conduction-time ($T_{OFF}$) after waiting for a delay $T_{BLANK}$ to discard LC ringing due to a leakage inductance of the transformer 102 and a parasitic capacitance of the switch SW. During the secondary conduction-time ($T_{OFF}$), the voltage across the primary winding of the transformer 102 represents the voltage across the secondary winding of the transformer 102 multiplied by a turns ratio of the transformer 102. An example of the voltage sensing circuit 112 is shown in FIG. 4.

Figure 5:
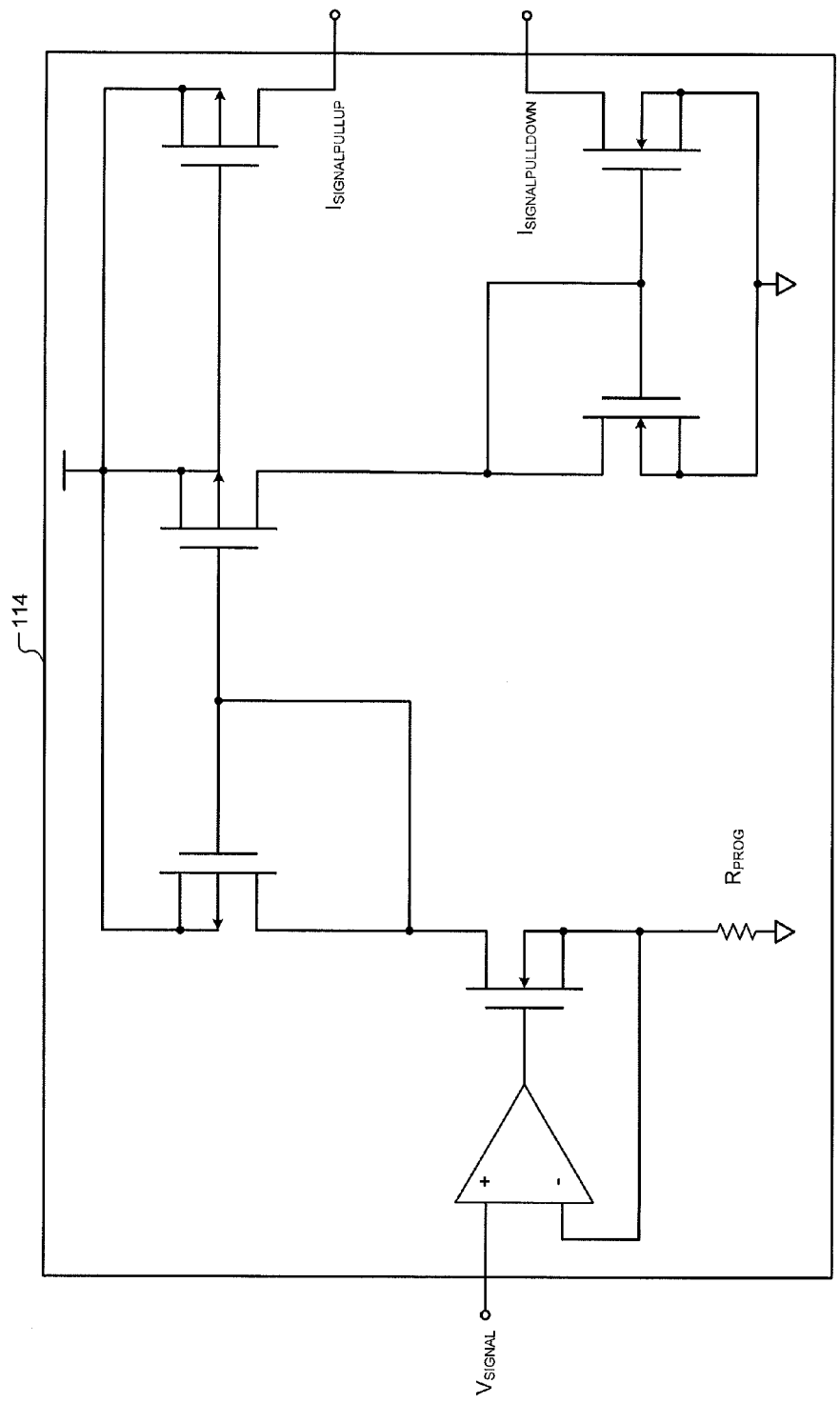
FIG. 5 shows an example of a voltage-to-current (V-I) converter circuit used in the primary side regulator circuit shown in FIG. 3.

The V-I converter 114-1 generates a first current proportional to the input voltage $V_{IN}$. The V-I converter 114-2 generates a second current proportional to the voltage LX. A summing circuit 115 subtracts the second current from the first current and generates a current $I_{IN}$. The second current can be neglected if the voltage drop across the switch SW is negligible. The V-I converter 114-3 generates a current $I_{OUT}$ proportional to $V_{OUTSENSE}$. The V-I converter 114-3 may scale up the current $I_{OUT}$ by a factor 143. An example of the V-I converters 114 is shown in FIG. 5.

The zero current detector 116 uses the control signal NDRV generated by the PWM circuit 108, the current $I_{IN}$, and the current $I_{OUT}$ to predict the sampling time $T_{SAMPLE}$ at which the secondary current ramps down close to zero, and generates a sampling pulse F_SMP. The zero current detector 116 generates a single sampling pulse F_SMP during each cycle of the control signal. Accordingly, the zero current detector 116 may be called a pulse generator.

The sampling pulse F_SMP is a mono-shot signal that closes a sampling switch in the sampling circuit 118 for a period of $T_{PW}$ to sample $V_{OUTSENSE}$ onto a sampling capacitor in the sampling circuit 118. The sampled voltage ($V_{FB}$) is held until the sampling capacitor gets refreshed during a next cycle of the control signal.

The error amplifier 120 compares the sampled voltage $V_{FB}$ to a reference voltage $V_{REF}$ and generates an error signal. The PWM circuit 108 controls the duty cycle of switch SW based on the error signal to regulate the output voltage $V_{OUT}$. The resistance R senses the primary current and limits cycle-by-cycle current based on the error signal. A maximum current limit is a programmed peak current. Current limiting may also be implemented using a lossless method by sensing the voltage LX.

The zero current detector 116 accurately predicts the sampling time as follows. When the switch SW is turned on, the primary winding of the transformer 102 stores the magnetic energy that depends on the input voltage $V_{IN}$, the magnetization period ($T_{ON}$), and a magnetizing inductance of the transformer 102. Once the switch SW is turned off, the stored energy is delivered to the secondary winding of the transformer 102 during the demagnetization period ($T_{OFF}$). During the demagnetization period $T_{OFF}$, the voltage across the secondary winding of the transformer 102 can be expressed by the following equation:

$$V_{SEC-TOFF} = V_{OUT} + V_{DIODE} + V_{DCR} \quad (1)$$

where $V_{OUT}$ is the output voltage, $V_{DIODE}$ is the voltage drop across the diode D, and $V_{DCR}$ is the voltage drop across the parasitic resistance DCR of the secondary winding of the transformer 102.

During the demagnetization period $T_{OFF}$, the voltage across the secondary winding of the transformer 102 that gets reflected across the primary winding of the transformer 102 can be expressed by the following equation:

$$V_{PRI-TOFF} = \frac{N_{PRI}}{N_{SEC}} * (V_{OUT} + V_{DIODE} + V_{DCR}) \quad (2)$$

where $N_{PRI}$ denotes the number of turns of the primary winding of the transformer 102, and $N_{SEC}$ denotes the number of turns of the secondary winding of the transformer 102.

Figure 7:
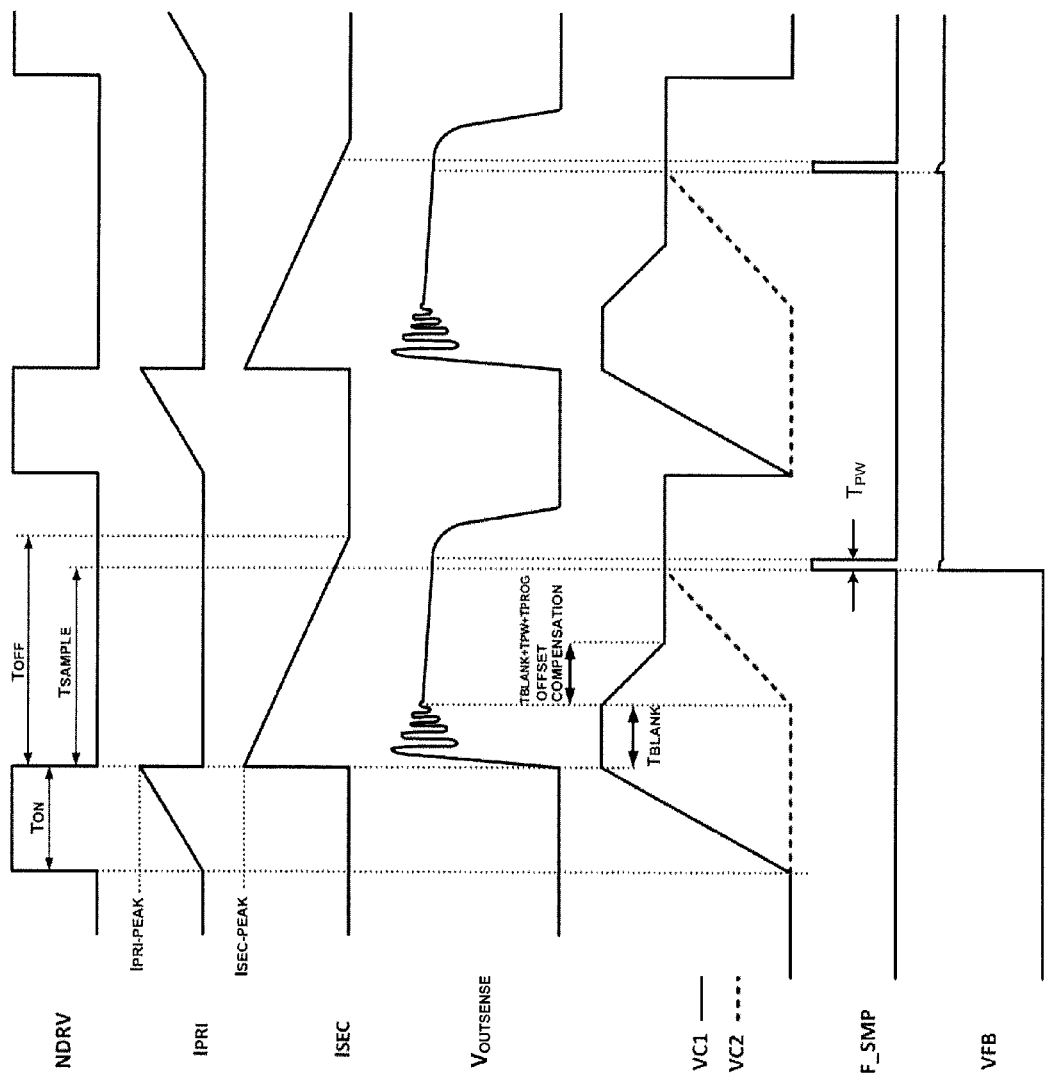
FIG. 7 shows a timing diagram of signals associated with the zero current detector shown in FIG. 6.

The voltage drops $V_{DIODE}$ and $V_{DCR}$ are dependent on the secondary current $I_{SEC}$, which ramps down from a peak value of $I_{SEC-PEAK}$ to zero during the demagnetization period $T_{OFF}$ (see FIG. 7). For accurately sensing the output voltage $V_{OUT}$ reflected across the primary winding of the transformer 102 during the demagnetization period $T_{OFF}$, the contribution of $V_{DIODE}$ and $V_{DCR}$ has to be minimized. This can be achieved by sampling the voltage across the primary winding of the transformer 102 when the secondary current $I_{SEC}$ reaches nearly zero. A zero crossing event of the secondary current $I_{SEC}$ can be accurately determined by equalizing actual values of magnetizing and demagnetizing fluxes.

In the transformer 102, the magnetization flux $\phi_{PRI}$ can be expressed by the following equation:

$$\phi_{PRI} = \frac{V_{PRI} * T_{ON}}{N_{PRI}} \quad (3)$$

The demagnetization flux $\phi_{SEC}$ can be expressed by the following equation:

$$\phi_{SEC} = \frac{V_{SEC} * T_{OFF}}{N_{SEC}} \quad (4)$$

Neglecting the leakage inductance of the transformer 102, the magnetization flux is equal to the demagnetization flux. From equations (3) & (4), we get $$T_{OFF} = \frac{V_{PRI}}{V_{SEC}} * \frac{N_{SEC}}{N_{PRI}} * T_{ON} \quad (5)$$

During $T_{ON}$, $V_{PRI} = (V_{IN} - V_{LX})$. During $T_{OFF}$, $V_{SEC} = (V_{OUT} + V_{DIODE} + V_{DCR})$. Substituting these values in equation (5), we get $$T_{OFF} = \frac{V_{IN} - V_{LX}}{(V_{OUT} + V_{DIODE} + V_{DCR})} * \frac{N_{SEC}}{N_{PRI}} * T_{ON} \quad (6)$$

Rewriting equation (6) in terms of equation (2), we get $$T_{OFF} = \frac{V_{IN} - V_{LX}}{V_{PRI-TOFF}} * T_{ON} \quad (7)$$

The zero current detector 116 determines the sampling time $T_{SAMPLE}$ based on $I_{IN}$, $I_{out}$, and $T_{ON}$ as follows. $I_{IN}$ is generated using the V-I converters 114-1 and 114-2 and the summing circuit 115, and can be expressed by the following equation:

$$I_{IN} = G * (V_{IN} - V_{LX}) \quad (8)$$

where G is the transconductance of the V-I converters 114-1 and 114-2.

The voltage sensing circuit 112 senses $V_{PRI-TOFF}$, which is the secondary voltage reflected in the primary winding of the transformer 102 during the demagnetization period $T_{OFF}$, and which can be expressed by the following equation:

$$VOUT_{SENSE}=\beta*V_{PRI\text{-}TOFF} \quad (9)$$

where $\beta=R_{REF}/R_{REG}$ is the attenuation factor imposed by the voltage sensing circuit 112.

The V-I converter 114-3 generates $I_{OUT}$ from $V_{OUTSENSE}$, which can be expressed by the following equation:

$$I_{OUT} = \frac{G}{\beta} * VOUT_{SENSE} \quad (10)$$

where $G/\beta$ is the transconductance of the V-I converter 114-3. From equations (9) and (10), we get $$I_{OUT}=G*V_{PRI\text{-}TOFF} \quad (11)$$

Equations (7), (8), and (11) are used to accurately predict the sampling time as follows.

Figure 6:
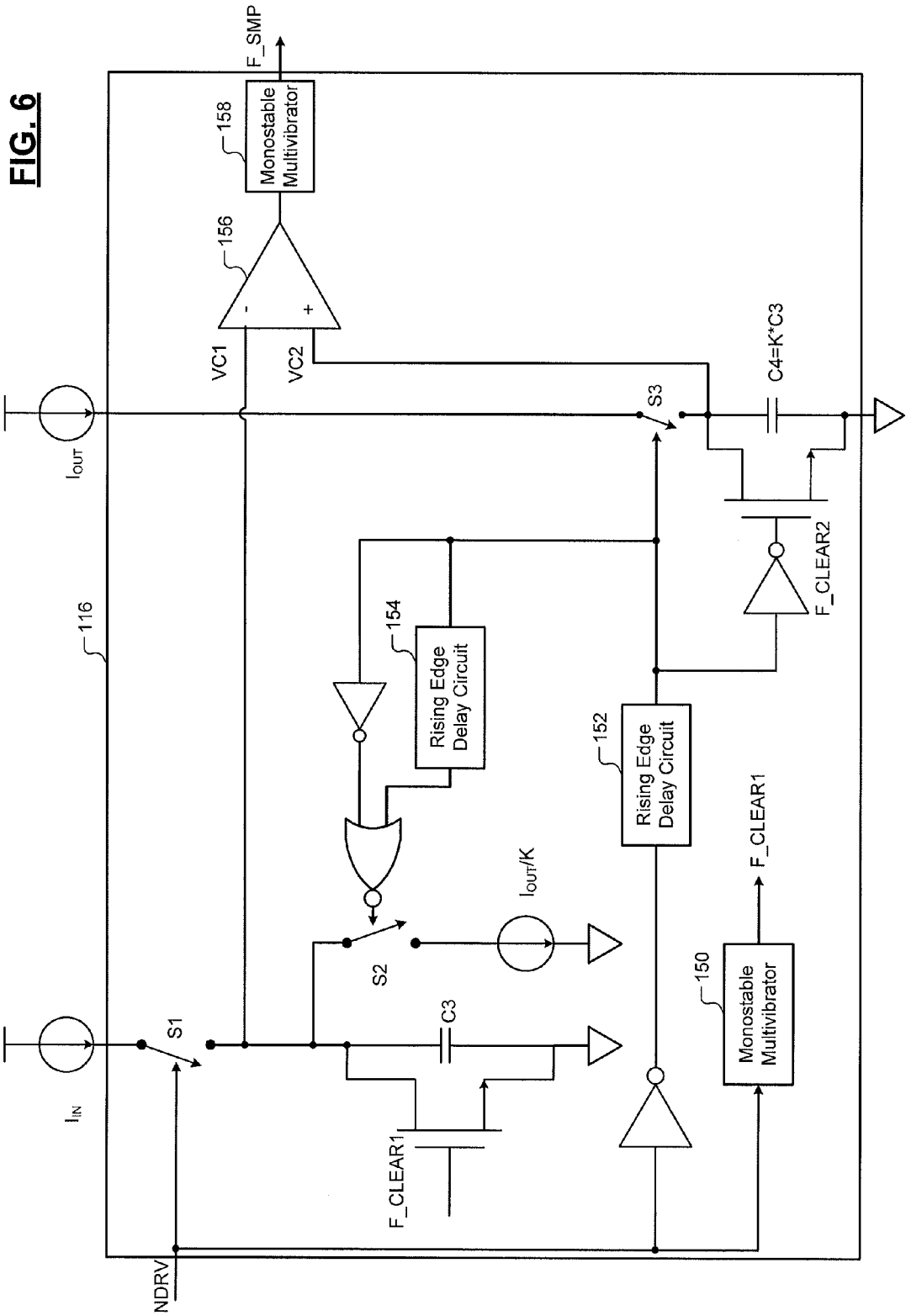
FIG. 6 shows an example of a zero current detector used in the primary side regulator circuit in FIG. 3.

Referring now to FIGS. 6 and 7, the zero current detector 116 is shown in detail. The zero current detector 116 includes a first capacitance C3, a first switch S1, a first monostable multivibrator (mono-shot) 150, a first delay circuit 152, a second delay circuit 154, a second switch S2, a second capacitance C4, a third switch S3, a comparator 156, and a second monostable multivibrator (mono-shot) 158. The value of the second capacitance C4 is K times the value of the value of the first capacitance C3, where K is a scaling factor whose value ranges from 0.5 to 1 as explained below.

Figure 8:
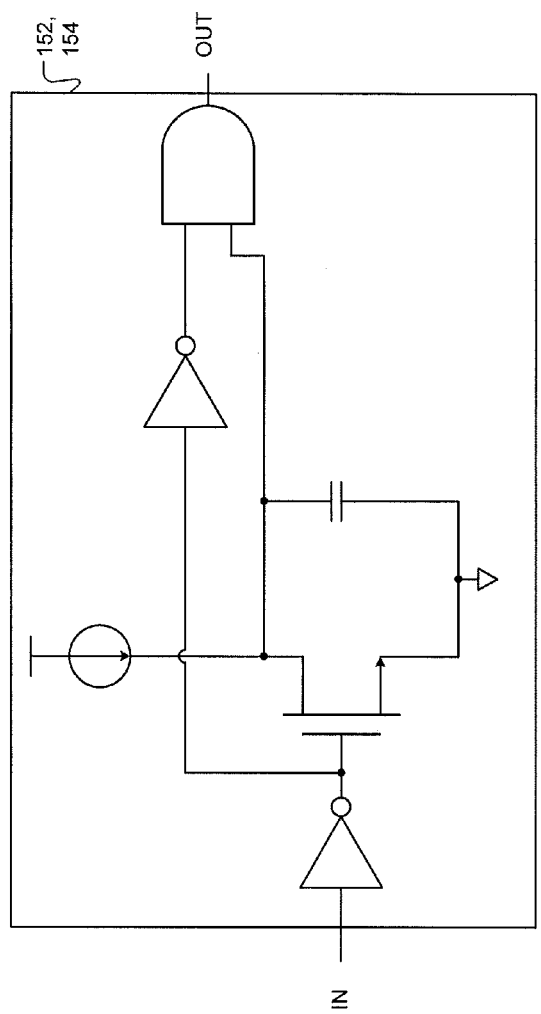
FIG. 8 shows an example of a delay circuit used in the zero current detector shown in FIG. 6.
Figure 9:
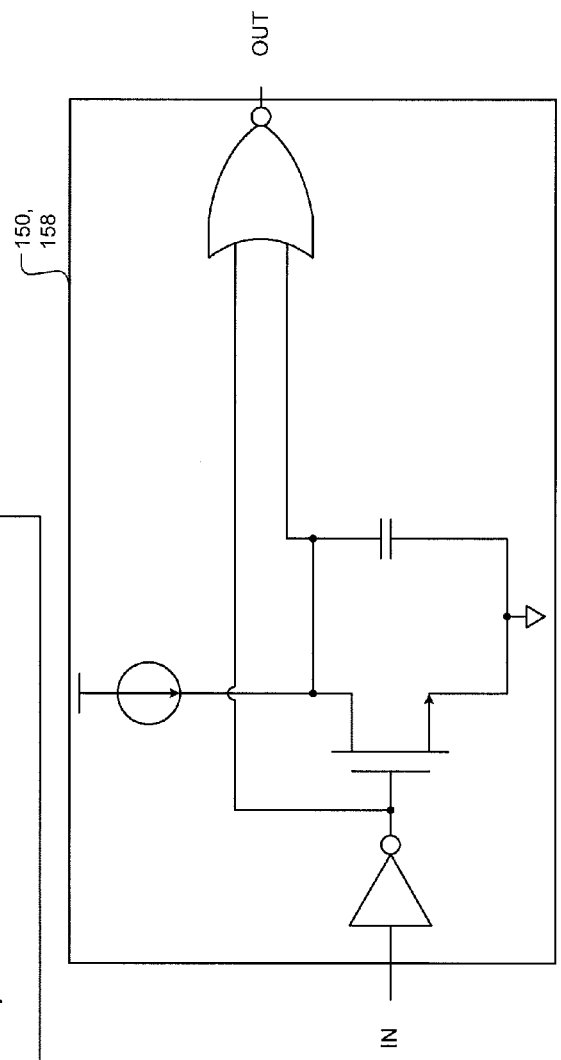
FIG. 9 shows an example of a monostable multivibrator used in the zero current detector shown in FIG. 6.

An example of a rising edge delay circuit that can be used to implement the first and second delay circuits 152 and 154 is shown in FIG. 8. An example of a monostable multivibrator (mono-shot) that can be used to implement the first and second monostable multivibrators 150 and 158 is shown in FIG. 9.

During a first cycle of the control signal NDRV generated by the PWM circuit 108, at a rising edge of the control signal NDRV, the first capacitance C3 is discharged to a ground potential by a pulse F_CLEAR1 generated by the first monostable multivibrator 150. After the F_CLEAR1 pulse, the first capacitance C3 starts charging from a current source $I_{IN}$ via the first switch S1 until a falling edge of the control signal NDRV. At the falling edge of the control signal NDRV, the first switch S1 is opened, and a voltage of the first capacitance C3 is held at a value VC1.

After waiting for a delay $T_{BLANK}$ from the falling edge of the control signal NDRV generated by the first delay circuit 152, the first capacitance C3 is discharged from the held value of VC1 via the second switch S2 and a current source $I_{OUT/K}$ for a duration of a compensation delay $T_{COMPENSATE}$ generated by the second delay circuit 154. The final voltage VC1 of the first capacitance C3 can be expressed by the following equation:

$$VC1 = \frac{I_{IN}*T_{ON}}{C} - \frac{\frac{I_{OUT}}{K}*T_{COMPENSATE}}{C} \quad (12)$$

For the rest of the secondary conduction-time, the second capacitance C4 is charged to a voltage VC2 via the third switch S3 and a current source $I_{OUT}$ after waiting for the delay $T_{BLANK}$ from the falling edge of the control signal NDRV. The comparator 156 compares the voltage VC2 to the voltage VC1 to determine the sampling time $T_{SAMPLE}$. At this instant, the second monostable multivibrator 158 generates the sampling pulse F_SMP with a pulse width of $T_{PW}$. The voltage of the second capacitance C4 at the sampling time $T_{SAMPLE}$ can be expressed by the following equation:

$$VC2 = \frac{I_{OUT}*(T_{SAMPLE} - T_{BLANK})}{K*C} \quad (13)$$

When VC1 and VC2 become equal, the comparator 156 generates the sampling pulse F_SMP. From equations (12) and (13), we get $$\frac{I_{IN}*T_{ON}}{C} - \frac{\frac{I_{OUT}}{K}*T_{COMPENSATE}}{C} = \frac{I_{OUT}*(T_{SAMPLE} - T_{BLANK})}{K*C} \quad (14)$$

$$\frac{I_{IN}*T_{ON}}{C} = \frac{I_{OUT}*(T_{SAMPLE} - T_{BLANK} + T_{COMPENSATE})}{K*C} \quad (15)$$

$$T_{SAMPLE} - T_{BLANK} + T_{COMPENSATE} = K*\left(\frac{I_{IN}*T_{ON}}{I_{OUT}}\right) \quad (16)$$

The compensation delay $T_{COMPENSATE}$ is a sum of the blanking time ($T_{BLANK}$), the pulse width ($T_{PW}$) of the sampling pulse F_SMP, and a programmable delay ($T_{PROG}$) that can be used to fine-tune the sampling time $T_{SAMPLE}$.

$$T_{COMPENSATE}=T_{BLANK}+T_{PW}+T_{PROG} \quad (17)$$

Substituting equation (17) in equation (16) and solving for $T_{SAMPLE}$, we get $$T_{SAMPLE} = K*\left(\frac{I_{IN}*T_{ON}}{I_{OUT}}\right) - (T_{PW} + T_{PROG}) \quad (18)$$

Substituting equations (8) and (11) into equation (18), we get $$T_{SAMPLE} = K*\left[\frac{(V_{IN} - V_{LX})*T_{ON}}{V_{PRI\text{-}TOFF}}\right] - (T_{PW} + T_{PROG}) \quad (19)$$

Re-writing equation (19) using equation (7), we get $$T_{SAMPLE}=K*T_{OFF}-T_{PW}-T_{PROG} \quad (20)$$

From the above equation, $T_{SAMPLE}$ should always occur before $T_{OFF}$. K is the scaling factor that controls the ratio of $T_{SAMPLE}$ to $T_{OFF}$ whose value is always less than or equal to one. $T_{PROG}$ may be used to move $T_{SAMPLE}$ either towards or away from the falling edge of NDRV by a fixed delay using an external programmable element. The sampling time $T_{SAMPLE}$ is shifted by $T_{PW}$ in equation (20) to ensure that the demagnetization voltage is available on the primary winding until the falling edge of the sampling pulse F_SMP when the sampling circuit 118 turns to hold mode.

In equation (5), the leakage inductance of the transformer 102 is not considered. The leakage inductance of the transformer 102 forces the SMPS 100 to operate with higher duty cycle, which in turn affects $T_{SAMPLE}$ prediction. When the leakage inductance is greater than or equal to a predetermined threshold, K and/or $T_{PROG}$ may be adjusted to accurately predict $T_{SAMPLE}$. For example, a leakage inductance below 3% may not affect $T_{SAMPLE}$ prediction. If, however, the leakage inductance is above 3%, values of K and/or $T_{PROG}$ may be adjusted to accurately predict $T_{SAMPLE}$. Typically, K may be selected close to 1, and $T_{PROG}$ may be selected to be zero for most applications. This would enable the sampling of the output voltage just before the secondary current ramps down to zero.

The Zero current detector 116 uses the scaling factor K to adjust a slope of the charging voltage across the second capacitance C4, with the value of K ranging from 0.5 to 1. As the value of K decreases, as shown in FIG. 7, the sampling time shifts from the time where the secondary current $I_{SEC}$ ceases to zero, to the left towards the time where $T_{ON}$ ends.

In the first delay circuit 152 (an example of which is shown in FIG. 8), the delay may be programmable. For example, the first delay circuit 152 may include a variable discharging current source (not shown) in addition to a fixed charging current source shown in FIG. 8. A default offset value of the variable current source is set such that the compensation delay $T_{COMPENSATE}$ is equal to a sum of $T_{BLANK}$ and $T_{PW}$. The compensation delay $T_{COMPENSATE}$ can be either increased or decreased by an amount $T_{PROG}$ around a default specified fixed delay of $T_{BLANK}$ plus $T_{PW}$, by modifying the variable discharging current source.

Figure 10:
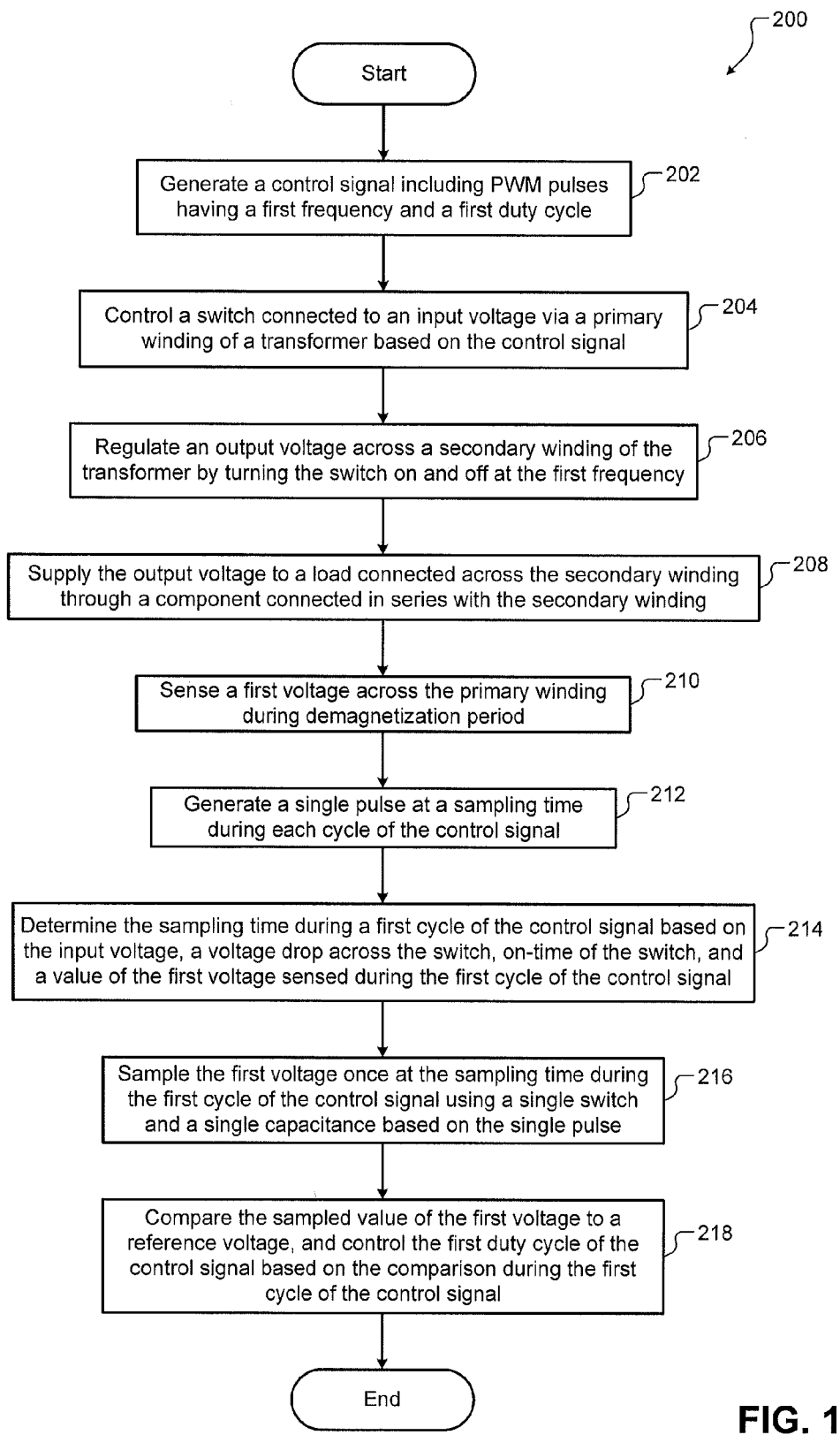
FIG. 10 is a flowchart of a predictive sampling method for primary-side sensing and regulation in isolated flyback converters.

Referring now to FIG. 10, a predictive sampling method 200 for primary-side sensing and regulation in isolated flyback converters is shown. At 202, a control signal including pulse width modulated pulses having a first frequency and a first duty cycle is generated. At 204, the control signal controls a switch connected to an input voltage via a primary winding of a transformer. At 206, the control signal regulates an output voltage across a secondary winding of the transformer by turning the switch on and off at the first frequency. At 208, the output voltage is supplied to a load connected across the secondary winding through a component connected in series with the secondary winding.

At 210, a first voltage across the primary winding is sensed during a demagnetization period represented by the off-time of the switch ($T_{OFF}$). The first voltage represents the output voltage across the secondary winding. At 212, a single pulse is generated at a sampling time during each cycle of the control signal. At 214, the sampling time during a first cycle of the control signal is determined based on the input voltage, a voltage drop across the switch, the first duty cycle (or primary-side conduction-time), and a value of the first voltage sensed during the first cycle of the control signal. The single pulse is delayed by a first period (e.g., $T_{BLANK}$) subsequent to an on-time of the PWM pulse to account for ringing due to a leakage inductance of the transformer and a parasitic capacitance of the switch.

At 216, using a single switch and a single capacitance, the first voltage is sampled once at the sampling time during the first cycle of the control signal based on the single pulse. A sampled value of the first voltage reflects the output voltage with minimized voltage drops across the component and parasitic elements of the secondary winding during the first cycle of the control signal. At 218, the sampled value of the first voltage is compared to a reference voltage, and an error signal is generated during the first cycle of the control signal. The first duty cycle of the control signal is controlled during the first cycle of the control signal based on the error signal.

Accordingly, the sampling time is independent of variations in the voltage drops across the component and the parasitic elements of the secondary winding from the first cycle of the control signal to a second cycle of the control signal as the sampling time is determined based on real-time output information. The sampling time is programmable to account for variances in a leakage inductance of the transformer. The sampling time is an instant that follows an on-time of the PWM pulse in the first cycle of the control signal after a time period that is equal to a scaled off-time of the switch ($K*T_{OFF}$) minus a sum of a duration of the single pulse ($T_{PW}$) and a programmable delay ($T_{PROG}$). The programmable delay ($T_{PROG}$) accounts for variances in the leakage inductance of the transformer. The sampling time lies between an end of an on-time of a pulse width modulated pulse in the first cycle of the control signal and an instant during an off-time of the pulse in the first cycle of the control signal when current in the secondary winding ramps down to zero.

Figure 11:
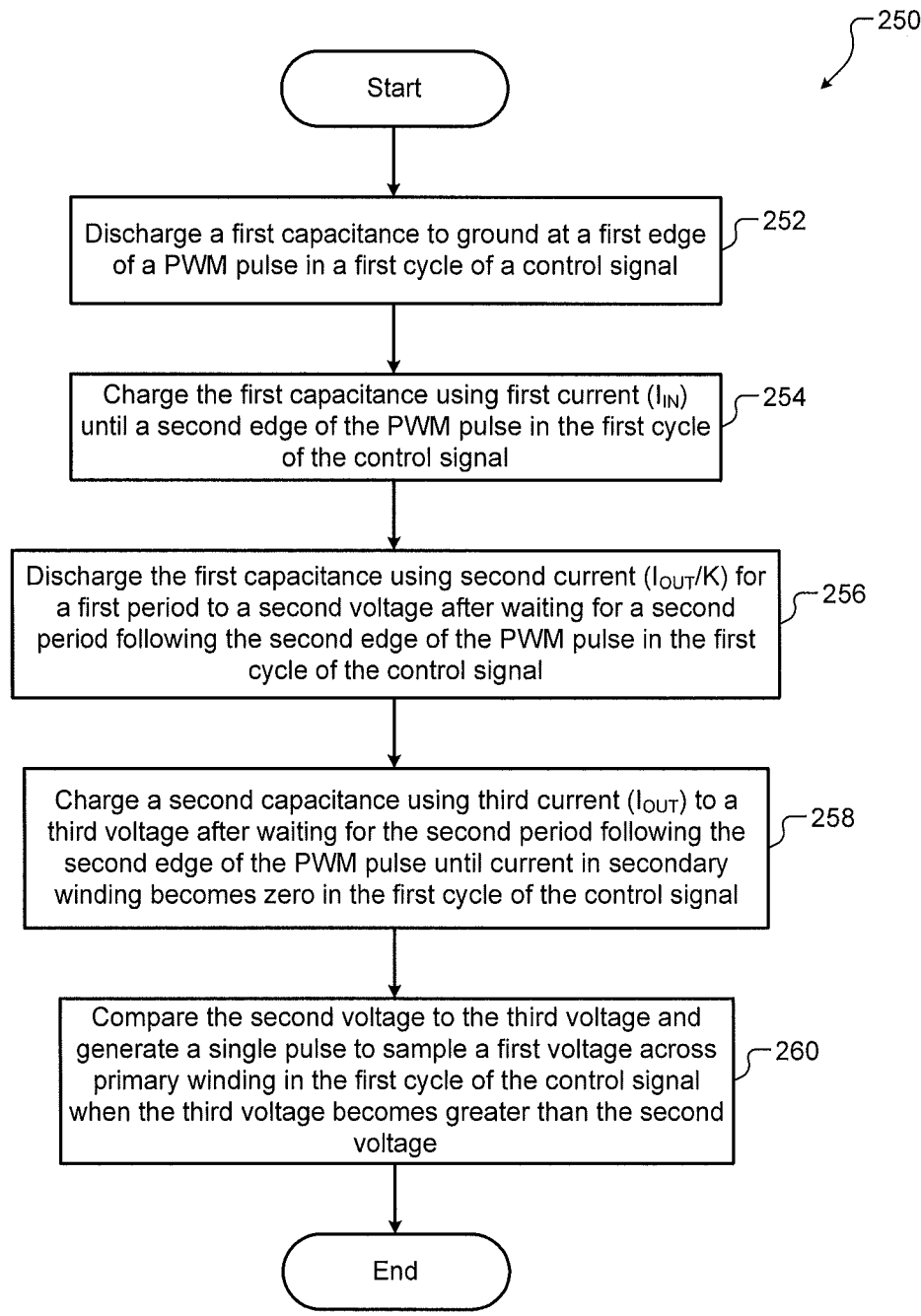
FIG. 11 is a flowchart of a method for generating a sampling pulse to sample a primary side voltage to regulate an output voltage on a secondary side.

Referring now to FIG. 11, a method 250 for generating the sampling pulse in each cycle of the control signal is shown. At 252, a first capacitance is discharged to a ground potential at a first edge (e.g., a rising edge) of a pulse width modulated pulse in a first cycle of the control signal using a mono-shot pulse. At 254, the first capacitance is charged using a first current ($I_{IN}$) to a first voltage (VC1) until a second edge (e.g., a falling edge) of the pulse width modulated pulse in the first cycle of the control signal. At 256, the first capacitance is discharged using a second current ($I_{OUT}/K$) for a first period (e.g., $T_{COMPENSATE}$) to a second voltage (final value of VC1) after waiting for a second period (e.g., $T_{BLANK}$) following the second edge of the pulse width modulated pulse in the first cycle of the control signal. At 258, a second capacitance is charged using a third current ($I_{OUT}$) to a third voltage (VC2) after waiting for the second period following the second edge of the pulse width modulated pulse in the first cycle of the control signal until current in the secondary winding becomes zero.

At 260, the second voltage is compared to the third voltage to determine a sampling time (e.g., $T_{SAMPLE}$) at which a single sampling pulse is generated when the third voltage becomes greater than the second voltage. The single sampling pulse is used to sample a first voltage across the primary winding of the transformer in the first cycle of the control signal. The first voltage sampled in the first cycle of the control signal reflects the voltage drops across the parasitic elements on the secondary side in the first cycle of the control signal.

In this method, the first period (e.g., $T_{COMPENSATE}$) is a sum of the second period (e.g., $T_{BLANK}$), a duration of the single pulse (e.g., $T_{PW}$), and a programmable delay (e.g., $T_{PROG}$). The second capacitance is K times the first capacitance, where K is less than or equal to 1 (e.g., 0.5≤K≤1). The sampling time is equal to K times an off-time of a pulse width modulated pulse in the first cycle of the control signal minus a sum of a duration of the single pulse and a programmable delay (i.e., $T_{SAMPLE}=K*T_{OFF}-(T_{PW}+T_{PROG})$).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

What is claimed is:

1. A system comprising:
 a switch connected to an input voltage via a primary winding of a transformer;
 a pulse width modulator that generates a control signal including pulse width modulated pulses having a first frequency and a first duty cycle, that controls the switch based on the control signal, and that regulates an output voltage across a secondary winding of the transformer by turning the switch on and off at the first frequency, wherein the output voltage is supplied to a load connected across the secondary winding through a component connected in series with the secondary winding;

a voltage sensing circuit that senses a first voltage across the primary winding during a demagnetization period represented by an off-time of the switch, wherein the first voltage represents the output voltage across the secondary winding;

a pulse generator that generates a single pulse at a sampling time during each cycle of the control signal, wherein the sampling time during a first cycle of the control signal is determined based on the input voltage, a voltage drop across the switch, an on-time of the switch, and a value of the first voltage sensed during the first cycle of the control signal;

a sampling circuit that samples the first voltage based on the single pulse at the sampling time during the first cycle of the control signal, wherein a sampled value of the first voltage reflects the output voltage with minimized voltage drops across the component and parasitic elements of the secondary winding during the first cycle of the control signal; and an error amplifier that compares the sampled value of the first voltage to a reference voltage and that outputs an error signal to the pulse width modulator during the first cycle of the control signal, wherein the pulse width modulator controls the first duty cycle of the control signal during the first cycle of the control signal based on the error signal generated by the error amplifier.

2. The system of claim 1 wherein the sampling time is independent of variations in the voltage drops across the component and the parasitic elements of the secondary winding from the first cycle of the control signal to a second cycle of the control signal.

3. The system of claim 1 wherein the sampling time is programmable to account for variances in a leakage inductance of the transformer.

4. The system of claim 1 wherein the sampling circuit includes a single switch and a single capacitance.

5. The system of claim 1 wherein:
the sampling time occurs after a time period following an on-time of a pulse width modulated pulse in the first cycle of the control signal;
the time period is equal to a scaled off-time of the switch minus a sum of a duration of the single pulse and a programmable delay; and
the programmable delay accounts for variances in a leakage inductance of the transformer.

6. The system of claim 1 wherein the sampling time lies between an end of an on-time of a pulse width modulated pulse in the first cycle of the control signal and an instant during an off-time of the pulse in the first cycle of the control signal when current in the secondary winding ramps down to zero.

7. The system of claim 1 further comprising a delay circuit that delays the sensing of the first voltage by a first period subsequent to an on-time of a pulse width modulated pulse in the first cycle of the control signal to account for ringing due to a leakage inductance of the transformer and a parasitic capacitance of the switch.

8. The system of claim 1 wherein the pulse generator comprises:
a first capacitance that is discharged to a ground potential at a first edge of a pulse width modulated pulse in the first cycle of the control signal, that is charged until a second edge of the pulse width modulated pulse in the first cycle of the control signal, and that is discharged for a first period to a second voltage after waiting for a second period following the second edge of the pulse width modulated pulse in the first cycle of the control signal;

a second capacitance that is charged to a third voltage after waiting for the second period following the second edge of the pulse width modulated pulse in the first cycle of the control signal until current in the secondary winding becomes zero; and a comparator that compares the second voltage to the third voltage and that generates the single pulse when the third voltage becomes greater than the second voltage.

9. The system of claim 8 wherein the first period is a sum of the second period, a duration of the single pulse, and a programmable delay.

10. The system of claim 8 wherein the second capacitance is K times the first capacitance, wherein K is less than or equal to 1.

11. The system of claim 10 wherein the sampling time is equal to K times an off-time of the pulse width modulated pulse in the first cycle of the control signal minus a sum of a duration of the single pulse and a programmable delay.

12. The system of claim 10 wherein:
the first capacitance is charged using a first current until the second edge of the pulse width modulated pulse in the first cycle of the control signal, where the first current is proportional to the input voltage;
the first capacitance is discharged using a second current for the first period to the second voltage after waiting for the second period following the second edge of the pulse width modulated pulse in the first cycle of the control signal, where the second current is proportional to the first voltage divided by K; and
the second capacitance is charged using a third current to the third voltage after waiting for the second period following the second edge of the pulse width modulated pulse in the first cycle of the control signal until current in the secondary winding becomes zero, where the third current is proportional to the first voltage.

13. A method comprising:
generating a control signal including pulse width modulated pulses having a first frequency and a first duty cycle;
controlling a switch connected to an input voltage via a primary winding of a transformer based on the control signal;
regulating an output voltage across a secondary winding of the transformer by turning the switch on and off at the first frequency;
supplying the output voltage to a load connected across the secondary winding through a component connected in series with the secondary winding;
sensing a first voltage across the primary winding during a demagnetization period represented by an off-time of the switch, wherein the first voltage represents the output voltage across the secondary winding;
generating a single pulse at a sampling time during each cycle of the control signal;
determining the sampling time during a first cycle of the control signal based on the input voltage, a voltage drop across the switch, an on-time of the switch, and a value of the first voltage sensed during the first cycle of the control signal;
sampling the first voltage based on the single pulse at the sampling time during the first cycle of the control signal, wherein a sampled value of the first voltage reflects the output voltage with minimized voltage drops across the component and parasitic elements of the secondary winding during the first cycle of the control signal;

comparing the sampled value of the first voltage to a reference voltage;

generating an error signal based on the comparison during the first cycle of the control signal; and controlling the first duty cycle of the control signal during the first cycle of the control signal based on the error signal.

14. The method of claim 13 wherein the sampling time is independent of variations in the voltage drops across the component and the parasitic elements of the secondary winding from the first cycle of the control signal to a second cycle of the control signal.

15. The method of claim 13 wherein the sampling time is programmable to account for variances in a leakage inductance of the transformer.

16. The method of claim 13 wherein the sampling of the first voltage is performed using a single switch and a single capacitance.

17. The method of claim 13 wherein:

the sampling time occurs after a time period following an on-time of a pulse width modulated pulse in the first cycle of the control signal;

the time period is equal to a scaled off-time of the switch minus a sum of a duration of the single pulse and a programmable delay; and the programmable delay accounts for variances in a leakage inductance of the transformer.

18. The method of claim 13 wherein the sampling time lies between an end of an on-time of a pulse width modulated pulse in the first cycle of the control signal and an instant during an off-time of the pulse in the first cycle of the control signal when current in the secondary winding ramps down to zero.

19. The method of claim 13 further comprising delaying the sensing of the first voltage by a first period subsequent to an on-time of a pulse width modulated pulse in the first cycle of the control signal to account for ringing due to a leakage inductance of the transformer and a parasitic capacitance of the switch.

20. The method of claim 13 further comprising:

discharging a first capacitance to a ground potential at a first edge of a pulse width modulated pulse in the first cycle of the control signal;

charging the first capacitance until a second edge of the pulse width modulated pulse in the first cycle of the control signal;

discharging the first capacitance for a first period to a second voltage after waiting for a second period following the second edge of the pulse width modulated pulse in the first cycle of the control signal;

charging a second capacitance to a third voltage after waiting for the second period following the second edge of the pulse width modulated pulse in the first cycle of the control signal until current in the secondary winding becomes zero;

comparing the second voltage to the third voltage; and generating the single pulse when the third voltage becomes greater than the second voltage.

21. The method of claim 20 wherein the first period is a sum of the second period, a duration of the single pulse, and a programmable delay.

22. The method of claim 20 wherein the second capacitance is K times the first capacitance, wherein K is less than or equal to 1.

23. The method of claim 22 wherein the sampling time is equal to K times an off-time of the pulse width modulated pulse in the first cycle of the control signal minus a sum of a duration of the single pulse and a programmable delay.

24. The method of claim 22 further comprising:

charging the first capacitance using a first current until the second edge of the pulse width modulated pulse in the first cycle of the control signal, where the first current is proportional to the input voltage;

discharging the first capacitance using a second current for the first period to the second voltage after waiting for the second period following the second edge of the pulse width modulated pulse in the first cycle of the control signal, where the second current is proportional to the first voltage divided by K; and charging the second capacitance using a third current to the third voltage after waiting for the second period following the second edge of the pulse width modulated pulse in the first cycle of the control signal until current in the secondary winding becomes zero, where the third current is proportional to the first voltage.

* * * * *

UNITED STATES PATENT AND TRADEMARK OFFICE
CERTIFICATE OF CORRECTION

PATENT NO.         : 9,093,910 B1
APPLICATION NO.    : 14/277373
DATED              : July 28, 2015
INVENTOR(S)        : Ankamreddi et al.

Page 1 of 1

It is certified that error appears in the above-identified patent and that said Letters Patent is hereby corrected as shown below:

On the Title Page:
item 22,                After "May 14, 2014", insert item --(65) Prior Publication Data US 2015/0236602 A1 Aug. 20, 2015--

In the Drawings:
Drawing Sheet 6 of 9, Fig. 7    Delete "TBLANK+TPW+TPROG" and insert --$T_{BLANK}+T_{PW}+T_{PROG}$--
Drawing Sheet 6 of 9, Fig. 7    Delete "IPRI" and insert --$I_{PRI}$--
Drawing Sheet 6 of 9, Fig. 7    Delete "ISEC" and insert --$I_{SEC}$--
Drawing Sheet 6 of 9, Fig. 7    Delete "VFB" and insert --$V_{FB}$--

In the Specification:
Column 6, Line 62     Delete "13." and insert --$\beta$.--
Column 7, Line 14     Delete "143." and insert --$1/\beta$.--
Column 8, Line 57     Delete "1our," and insert --$I_{OUT}$,--

Column 9, Equation 10   Delete "$I_{OUT} = \frac{G}{\beta} * VOUT_{SENSE}$" and insert --$I_{OUT} = \frac{G}{\beta} * V_{OUTSENSE}$--

Signed and Sealed this
Nineteenth Day of January, 2016

Michelle K. Lee
*Director of the United States Patent and Trademark Office*